United States Patent [19]

Skotheim et al.

[11] Patent Number: 4,882,243
[45] Date of Patent: Nov. 21, 1989

[54] PREPARATION OF METALLIC CATION CONDUCTING POLYMERS BASED ON STERICALLY HINDERED PHENOLS CONTAINING POLYMERIC SYSTEMS

[75] Inventors: Terje A. Skotheim, Shoreham, N.Y.; Yoshiyuki Okamoto, Fort Lee, N.J.; Hung S. Lee, Woodside, N.Y.

[73] Assignees: Polytechnic University, Brooklyn, N.Y.; Associated Universities, Inc., Washington, D.C.

[21] Appl. No.: 275,013

[22] Filed: Nov. 22, 1988

[51] Int. Cl.$^4$ .............................. H01M 10/40
[52] U.S. Cl. .................... 429/192; 252/62.2
[58] Field of Search ............... 429/192; 252/62.2

[56] References Cited

U.S. PATENT DOCUMENTS

| | | | |
|---|---|---|---|
| 4,471,037 | 9/1984 | Bannister | 429/192 |
| 4,556,615 | 12/1985 | Bannister | 429/192 |
| 4,654,279 | 3/1987 | Bauer et al. | 429/192 |
| 4,737,422 | 4/1988 | Knight et al. | 429/192 |
| 4,798,773 | 1/1989 | Yasukawa et al. | 429/192 |

*Primary Examiner*—Donald L. Walton
*Attorney, Agent, or Firm*—Margaret C. Bogosian

[57] ABSTRACT

The present invention relates to ion-conducting solvent-free polymeric systems characterized as being cationic single ion conductors. The solvent-free polymer electrolytes comprise a flexible polymer backbone to which is attached a metal salt, such as a lithium, sodium or potassium salt, of a sterically hindered phenol. The solid polymer electrolyte may be prepared either by (1) attaching the hindered phenol directly to a flexible polymeric backbone, followed by neutralization of the phenolic OH's or (2) reacting the hindered phenol with a polymer precursor which is then polymerized to form a flexible polymer having phenolic OH's which are subsequently neutralized. Preferably the hindered phenol-modified polymeric backbone contains a polyether segment. The ionic conductivity of these solvent-free polymer electrolytes has been measured to be in the range of $10^{-4}$ to $10^{-7}$ S cm$^{-1}$ at room temperature.

22 Claims, No Drawings

PREPARATION OF METALLIC CATION CONDUCTING POLYMERS BASED ON STERICALLY HINDERED PHENOLS CONTAINING POLYMERIC SYSTEMS

This invention was made with Government support under contract number DE-AC02-76CH00016, awarded by the U.S. Department of Energy to Associated Universities, Inc. The Government has certain rights in the invention.

BACKGROUND OF THE INVENTION

The present invention relates to the preparation of ion-conducting, solvent-free solid polymeric systems characterized as being cationic single-ion conductors. Solvent-free polymer electrolytes have generated significant interest in recent years due to their versatility. For instance, solvent-free solid polymer electrolytes have been used in high energy density batteries, photoelectrochemical cells and solid state electrochromic displays.

Like liquid electrolytes and solvent-swollen polyelectrolytes used in ion-exchange resins, solvent-free polymer electrolytes possess ion-transport properties. Both cation transport and anion transport in these solid polymer electrolytes have been substantiated and are well documented in the prior art. However, these solid polymer electrolytes exhibit far lower ionic conductivity than either the liquid or solvent swollen (poly)electrolytes.

It is believed that the lower conductivity of solid polymer electrolytes is caused by extensive ion pairing and ion clustering which, in effect, ionically crosslinks the polymer. The resulting solid electrolyte is brittle and glassy at room temperature. It is known to use plasticizers in polymers to increase polymer chain flexibility by reducing intermolecular attractions, to increase free volume and to decrease the glass transition temperature, $T_g$. These changes are also known to increase ionic conductivity in solid polymer electrolytes.

Early investigation in the solvent-free polymer electrolyte field focused on alkali metal ion conduction in solid electrolytes formed by alkaline metal salts and poly(ethylene oxide) or poly(propylene oxide). See, for example, M. B. Armand, *Proc. on the Workshop on Lithium Nonaqueous Battery ElectroChemistry*, Cleveland, June 1980, pp. 261–270. However, substantial anion mobility was found in electrolytes made from a charged polymer salt complex. When such a complex is employed in a battery, for instance a lithium battery, it produces a negative effect on the energy efficiency of the battery because it results in local concentration gradients which result in deleterious polarization of the cell, lowering the output current.

Attempts have been made to immobilize the anion on the polymer chain in order to achieve specific cationic activity. Several approaches have included the synthesis of cationic single-ionic conductors based on carboxylate or sulfonate salts. These reported electrolytes are limited in their application due to low conductivity or lack of electrochemical stability. Presumably, the low conductivity is due to the extensive ion-pairing in theses salts.

A more recent approach to overcome the extensive ion pairing in these salts is described in U.S. Pat. No. 4,471,037 to Bannister. In that patent, Bannister describes a lithium-polyether complex which is prepared by employing an atactic polyether having a glass transition temperature of substantially less than 0° C. and being capable of forming a complex with $Li^+$ ions but not with $Na^+$ ions. Because the polyether is atactic, that is, the polyether has no stereoregularity, it has an enhanced proportion of amorphous regions. Bannister theorizes that high ionic conductivity may occur via such amorphous regions. Moreover, Bannister suggests that because the polyether is not capable of forming complexes with $Na^+$, the $Li^+$ ions in the electrolyte are more loosely bound to the polyether, thereby giving rise to higher lithium ion conductivity. While the Bannister complex represents an advance in the art, it represents a limited advance insofar as this complex can be prepared only from atactic polyethers and lithium salts.

SUMMARY OF THE INVENTION

It is apparent that in applications using solid polymer electrolytes, for example, a secondary solid-state battery, it would be preferable to have no anion migration, the result of which is less polarization and higher power output.

Accordingly, it is an object of the present invention to provide a class of solvent-free polymers which are characterized by cationic single-ion conductivity.

Another object of the present invention is to provide a relatively broad class of solid polymeric electrolytes which, when incorporated in a secondary solid-state battery, lead to low polarization and high power output.

Still another object is to provide a facile process for preparing polymeric systems which exhibit cationic conductivity.

Another object is to provide a process for preparing ion-conducting, solvent-free polymeric systems, which process is characterized by a high degree of flexibility such that the polymeric systems which are prepared may be tailored to suit different end uses.

These and other objects and advantages are achieved in accordance with the invention by the attachment of a metal salt, such as a lithium, sodium or potassium salt, of a sterically hindered phenol to a polymeric backbone or to a polymer precursor which is polymerized to form a polymeric backbone having the hindered phenol attached thereto. The resulting polymeric systems exhibit reduced tight ion-pairing relative to prior art solid polymer electrolytes, and are thus characterized by very high single-ion cationic conductivity; up to 1000 times higher than prior art materials.

The hindered phenols, which are 2,6-disubstituted phenols, may be attached to a wide variety of polymeric backbones and polymer precursors in order to tailor the mechanical and ion-conducting properties of the resulting polymeric systems. The polymeric backbones which may be modified in accordance with the present invention comprise virtually any polymer which will react with the hindered phenol and which is characterized by a low glass transition temperature, $T_g$, i.e. in the range from about $-50°$ to about $-150°$ C. The polymer precursors which may be reacted with the hindered phenol include virtually any precursor which can be reacted with the phenol and which also can be polymerized to form a polymeric backbone having hindered phenol groups attached thereto and a $T_g$ of from about $-50°$ to about $-150°$ C. The reaction of the hindered phenol with the polymer precursor may be performed either before the precursor is polymerized or after the precursor is polymerized. Alternatively, the polymerization of the precursor and the reaction of the hindered phenol with the precursor may be effected simultaneously.

In one embodiment, the hindered phenol-modified polymeric backbone or the polymer precursors thereof, which are to be modified, will contain a polyether segment, such as an oligo (oxyalkylene) segment. It will be appreciated that the presence of one or more oligo (oxyalkylene) segments in the polymer backbone facilitates the tailoring of the mechanical and ion conducting properties of the hindered phenol-modified backbones. For example, a fabricator can achieve various end properties merely by selecting a polymeric backbone having a particular length or number of the oligo (oxyalkylene) segments and/or by selecting a polymer backbone having particular oxyalkylene segments, e.g. by selecting a backbone having oxypropylene segments as opposed to oxyethylene segments.

DETAILED DESCRIPTION OF THE INVENTION

The ion-conducting, solvent-free polymeric systems of the present invention are solvent-free polymer electrolytes characterized as being cationic single-ion conductors. These solid polymer electrolytes comprise a flexible polymer backbone to which is attached a metal salt of a sterically hindered phenol.

The polymer electrolytes of this invention may be prepared by attaching a hindered phenol directly to a flexible polymeric backbone, followed by neutralization of the phenolic OH's on the backbone. In one alternative, the solid polymeric electrolytes may be prepared by first reacting the hindered phenol with a polymer precursor, followed by polymerization of the modified precursor to form a flexible polymer having phenolic OH's, and then followed by neutralization of the phenolic OH's. In yet another alternative, the reaction between the hindered phenol and the precursor may be effected simultaneously with the polymerization of the precursor, followed by neutralization of the phenolic OH's on the resulting polymer.

The flexible polymeric backbone may be any polymer which can be reacted with the hindered phenol, and which has a low glass transition temperature, $T_g$, preferably in the range from about $-50°$ to about $-150°$ C. The polymer precursors which may be reacted with the hindered phenol include virtually any precursor which can be reacted with the phenol and which also can be polymerized to form a polymeric backbone having hindered phenol groups attached thereto and a $T_g$ of from about $-50°$ to about $-150°$ C.

Preferably, the polymeric system is a polyether system. More preferably, the polymeric system contains an oligo(oxyalkylene) segment, such as an oligo(oxyethylene), oligo(oxypropylene) or oligo(oxybutylene) segment. Among the preferred polymeric systems there may be listed, for example, (1) siloxane-alkylene oxide polymers, (2) oligo(oxyalkylene) alkyl acrylate and methacrylate polymers, (3) oligo (oxyalkylene)-benzene tricarboxylate polymers, and (4) oligo (oxyalkylene)-nylon polymers. The oxyalkylene segments may comprise, for example, oxyethylene segments, oxypropylene segments, oxybutylene segments or the like, with oxyethylene segments being preferred.

Suitable polymeric systems characterized as having a flexible backbone and a low glass transition temperature, $T_g$, are exemplified by the following structural formulae:

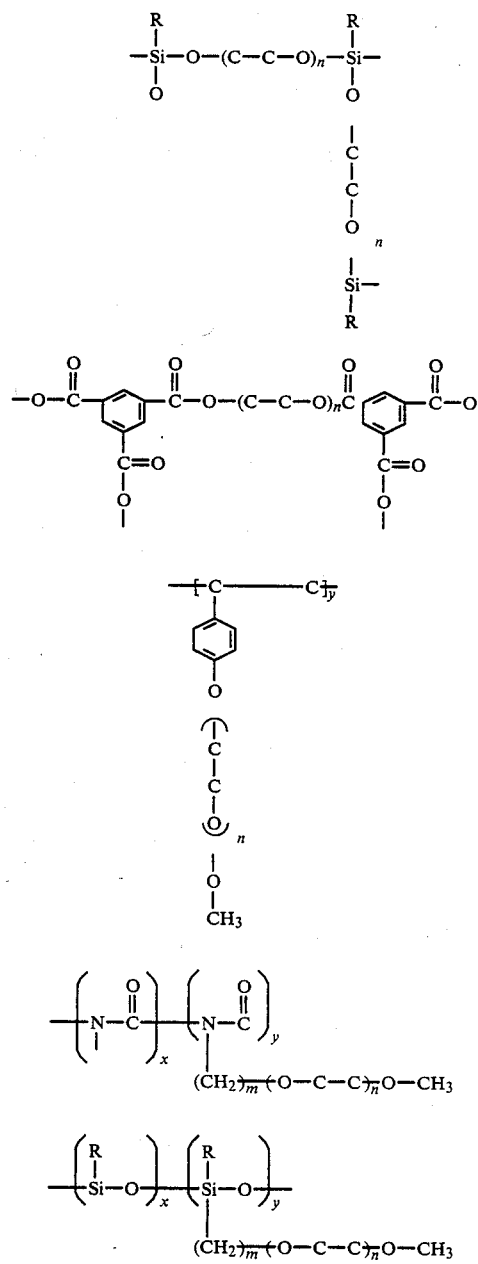

wherein
R=methyl, ethyl, phenyl, naphthyl
n=3–12
m,x,y=1–5

The foregoing polymeric systems are intended to be illustrative and are not to be construed as limiting the types of systems contemplated by the present invention.

The sterically hindered phenols are preferably 2,6-substituted phenols and more preferably 2,6-alkyl substituted phenols or 2,6-alkoxy substituted phenols. The phenols can be substituted further at the 4-position. Substituents that may be at the 4-position include, for example, hydroxy, alkyl, hydroxyalkylene, alkoxy, aryl, vinyl, and isocyanate. Included among the preferred sterically hindered phenols are 2,6-di-alkyl-4-hydroxy phenol, 2,6-di-alkyl-4-isocyanato phenol, 2,6-di-alkyl-4-hydroxyalkylene phenol (such as 3,5-di-t-butyl-4- hydroxy benzyl alcohol), 2,6-di-alkyl-4-vinyl phenol, and 2,6-di-alkyl-4-benzyl phenol. Examples of sterically-hindered phenols are represented by the following structural formulae:

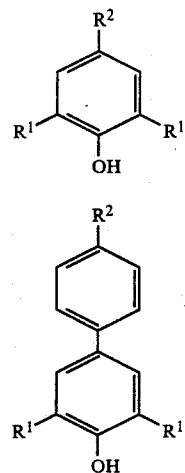

wherein:
$R^1$ = i-propyl, t-butyl, t-pentyl, methoxy, ethoxy and propoxy
$R^2$ = hydroxy, alkyl, alkoxy, aryl, vinyl, hydroxyalkylene and isocyanato.

Throughout this disclosure, alkyl represents a $C_1$-$C_6$ alkyl, preferably a $C_1$-$C_4$ alkyl; alkoxy represents a $C_1$-$C_6$ alkoxy, preferably a $C_1$-$C_4$ alkoxy; and alkylene represents a $C_1$-$C_4$ alkylene. All percentages are percentages by weight, all time periods are in hours and all temperatures are in °C., unless otherwise specifically noted.

The solvent-free polymer electrolytes of the present invention are prepared by reacting a sterically hindered phenol with a selected polymer or precursor thereof. The reaction is generally carried out while the hindered phenol and polymer or precursor are dissolved in a suitable solvent such as tetrahydrofuran, toluene, dimethylformamide, dimethylsulfoxide, or the like. When a polymer precursor is employed, the reaction may include the subsequent addition of an oxyalkylene-containing compound. The reaction is typically carried out at a temperature, on the order of from about −80° C. to about 80° C., depending upon the particular polymer backbone or precursor being employed. In preferred embodiments, the reaction is carried out in the presence of a catalyst such as triethylamine, $BF_3$-etherate, chloroplatinic acid, sodium cyanide or the like. The reaction usually is carried out in an inert atmosphere, such as under a nitrogen blanket.

After the hindered phenol has been attached to the backbone of the selected polymer, or after a polymer having attached hindered phenol groups has been prepared from a precursor, and preferably after the resulting polymer has been washed and at least partially free from solvent, the phenolic OH's are neutralized. Alkali metal compounds, such as Li, K, or Na compounds, e.g., lithium-t-butoxide, potassium-t-butoxide and sodium-t-butoxide, etc. are typically employed as the neutralizing agents. However, compounds of divalent metals, such as Cu or Mg, can also be employed. Preferably, Li, Na, or K alkoxides are used as the neutralizing agent.

After being neutralized, the resulting polymer salt (complex) is completely stripped of solvent, generally by heating in a vacuum at temperatures up to about 70° or 80° C. for periods up to about 20–25 hours. In most cases, heating at a temperature of about 60° C. in a vacuum for about 20 hours is sufficient to completely dry the polymer complex and to remove essentially all traces of solvent therefrom.

Dried polymer complexes prepared in accordance with this invention were tested to determine ionic conductivity. The conductivity measurement was conducted by placing the complex in a sealed cell in a dry box. Dried films of polymers wherein the phenols were neutralized with Li, Na or K alkoxide exhibited ionic conductivity in the range of $10^{-4}$ to $10^{-7}$ S cm$^{-1}$ at room temperature (25° C.). This conductivity is the highest reported to date and up to 1,000 times higher than the conductivity of cationic single ion conductors previously reported. The conductivity depends upon the nature of the metallic ion as well as the polymer composition.

The manner in which the hindered phenol-modified polymers of the present invention are prepared can be understood more fully by reference to the following illustrative examples.

EXAMPLE 1

A tetrahydrofuran solution (100 ml) of 3,5-di-t-butyl-4-hydroxy benzylalcohol (2.2 g, 0.01 mole) and trichlorophenyl silane (2.2 g, 0.01 mole) were placed in a three neck flask. A tetrahydrofuran solution (20 ml) of triethylamine (1.1 g, 0.01 mole) was added dropwise at 0° C. The air in the flask was replaced with nitrogen and the reaction carried out under nitrogen atmosphere. After all the amine solution was added, the mixture was stirred for one hour followed by refluxing for one hour. After cooling the solution, ω,ω'-dihydroxy oligo(oxyethylene), average MW 300 (3.0 g, 0.01 mole), was added, followed by triethylamine (2.2 g, 0.01 mole). The mixture was again refluxed for three hours. The amine-HCl salt produced was filtered and most of the solvent was removed in vacuum. The resulting viscous liquid was dissolved in chloroform and the solution was washed with 5% aqueous HCl solution and then twice with water. The solution was then dried over a molecular sieve and the phenolic OH was neutralized with potassium t-butyloxide. Solvent and t-butyl alcohol by-product were then removed in vacuum. The resulting polymer was completely dried in vacuum at 60° C. for 20 hours. The complex was then placed in the sealed cell in a dry box for the conductivity measurements. The conductivity for the complex was found to be $2.0 \times 10^{-6}$ S cm$^{-1}$ at 25° C. and $5.0 \times 10^{-5}$ S cm$^{-1}$ at 60° C.

EXAMPLE 2

A toluene solution (100 ml) of 2,6-di-t-butyl-4-vinyl phenol (4.4 g, 0.02 mole) and p-[methoxy hepta(oxyethylene)]-styrene (13.2 g, 0.03 mole) was cooled to −60° C. and copolymerization was carried out in the presence of $BF_3$-etherate (0.2 g). After removing about 80% of the toluene, the polymer obtained was precipitated by adding hexane and then the polymer was dissolved in tetrahydrofuran. The phenolic OH was neutralized with potassium t-butoxide, and then solvent and t-butyl alcohol were removed in vacuum. The resulting polymer was completely dried in vacuum at 60° C. for 20 hours. The complex was then placed in the sealed cell in a dry box for the conductivity measurements. The conductivity of the complex was found to be $7.0 \times 10^{-6}$ S cm$^{-1}$ at 25° C. and $1.2 \times 10^{-5}$ S cm$^{-1}$ at 60° C.

EXAMPLE 3

A toluene solution (100 ml) of 2,6-di-t-butyl-4-vinyl phenol (4.8 g, 0.02 mole) and μ-methoxy hepta(oxyethylene) methacrylate (12.6 g, 0.03 mole) was cooled to −60° C. and copolymerization was carried out in the presence of BF$_3$-etherate (0.2 g). The resulting polymer was washed with a dilute aqueous NaHCO$_3$ solution and then with water. After removing about 80% of the toluene, the polymer obtained was precipitated by adding hexane. The polymer was dissolved in tetrahydrofuran. The dissolved polymer was separated into three aliquots. A first aliquot was mixed with lithium t-butoxide to neutralize the phenolic OH. The second aliquot was neutralized with sodium t-butoxide, and the third was neutralized with potassium t-butoxide. The solvent and t-butyl alcohol were removed from each neutralized aliquot in vacuum. The resulting polymer aliquots were completely dried in high vacuum at 60° C. for 20 hours. The conductivities of the metal salts (at 35° C.) were measured and found to be $5 \times 10^{-5}$, $4 \times 10^{-4}$ and $5 \times 10^{-4}$ S cm$^{-4}$ for the Li, Na, K salts, respectively.

EXAMPLE 4

A dry tetrahydrofuran solution (100 ml) of polymethyl hydrosiloxane (6 g, 0.1 mole) obtained from Petrarch System and 2,6-di-t-butyl-4-vinyl phenol (4.8 g, 0.02 mole) was heated under N$_2$ atmosphere at about 60° C. (typically from about 40 to about 70° C.) for about 6 hours in the presence of chloroplatinic acid (0.5 g). After cooling the mixture to room temperature (typically about 0° C. to room temperature)ω-allyl methoxy hepta(oxyethylene) (30.4 g, 0.08 mole) was added and the resulting mixture was heated to about 60° C. (typically about 40 to about 70° C.) for approximately an additional 6 hours. The phenolic OH of the resulting copolymer was neutralized with sodium t-butoxide. The solvent and t-butyl alcohol were removed in vacuum. The resulting polymer complex was completely dried in high vacuum at 60° C. for 20 hours. The complex was then placed in the sealed cell for the conductive measurement in a dry box. The conductivity of the complex was found to be $1.0 \times 10^{-4}$ S cm$^{-1}$ at 25° C.

EXAMPLE 5

The co-polymerization of 40-(ω-methoxy hepto(oxyethylene) phenyl isocyanate (6.8 g, 0.02 mole) and 2,6-di-t-butyl phenyl-4-isocyanate (5.0 g, 0.021 mole) was carried out in dry dimethyl formamide solution (50 ml) in the presence of NaCN as the catalyst at −60° C. The resulting copolymer was separated into three aliquots which were neutralized, respectively, with Li or Na or K t-butoxide. The polymer salts obtained were completely dried in high vacuum at 60° C. for 20 hours. The conductivities (at 25° C.) of the complexes were found to be $7.0 \times 10^{-6}$, $8.0 \times 10^{-5}$ and $8.0 \times 10^{-5}$ S cm$^{-1}$ for the Li, Na, K salts, respectively.

While particular embodiments of the invention have been described, it will be understood, of course, that the invention is not limited thereto, and that many obvious modifications and variations thereof can be made, and that such modifications and variations are intended to fall within the scope of the appended claims.

We claim:

1. A solvent-free polymer electrolyte containing a sterically hindered phenol metal ion salt.

2. The solvent-free polymer electrolyte of claim 1, wherein the sterically hindered phenol is a 2,6-substituted phenol.

3. The solvent-free polymer electrolyte of claim 2, wherein the sterically hindered phenol is selected from the group consisting of 2,6-alkyl substituted phenols and 2,6-alkoxy substituted phenols.

4. The solvent-free polymer electrolyte of claim 3, wherein the sterically hindered phenol is 2,6-di-t-butyl-4-methoxy phenol.

5. The solvent-free polymer electrolyte of claim 3, wherein the sterically hindered phenol is 2,6-di-t-butyl-4-vinyl phenol.

6. The solvent-free polymer electrolyte of claim 2, wherein the sterically hindered phenol is 2,6-di-t-butyl-4-isocyanato phenol.

7. The solvent-free polymer electrolyte of claim 1, wherein the polymer comprises a structure having an oligo(oxyalkylene) segment therein.

8. The solvent-free polymer electrolyte of claim 7, wherein said structure also has a siloxane segment therein.

9. The solvent-free polymer electrolyte of claim 8, wherein the polymer comprises a siloxane-ethylene oxide copolymer.

10. The solvent-free polymer electrolyte of claim 9, wherein the sterically hindered phenol comprises 2,6-di-t-butyl-4-vinyl phenol.

11. The solvent-free polymer electrolyte of claim 1, wherein the metal ion is selected from the group consisting of lithium, sodium and potassium.

12. A process for making a solvent-free polymer electrolyte, comprising the steps of:
reacting a sterically hindered phenol with an oligo-(oxyalkylene)-containing polymer; and
neutralizing the phenol OH of the resulting polymer with a metal ion compound.

13. The process of claim 12, wherein the metal ion is selected from the group consisting of lithium, sodium and potassium.

14. The process of claim 12, wherein the metal ion compound is an alkoxide of lithium, sodium or potassium.

15. A process of making a solvent-free polymer electrolyte, comprising the steps of:
reacting a sterically hindered phenol with a polymer precursor which can be polymerized to form a flexible polymeric backbone;
further reacting the resulting product with an oligo (oxyalkylene)-containing compound to form a polymeric product having phenolic OH groups; and
neutralizing the phenol OH groups of the polymeric product with a metal ion compound.

16. The process of claim 15, wherein the metal ion is selected from the group consisting of lithium, sodium and potassium.

17. The process of claim 15, wherein the metal ion compound is an alkoxide of lithium, sodium or potassium.

18. A process for preparing a solvent-free ion conducting polymer, which comprises:
reacting in the presence of a solvent a polymer having a glass transition temperature range of about −50° C. to −150° C., and a hindered phenol having the Formula I or II

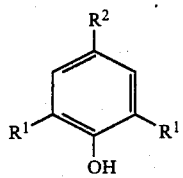

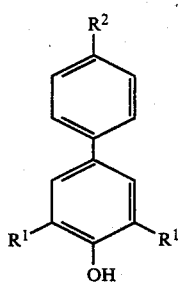

wherein each $R^1$, independently, is selected from i-propyl, t-butyl, t-pentyl, methoxy, ethoxy and propoxy, and $R^2$ is selected from hydroxy, alkyl, alkoxy, aryl, vinyl, hydroxyalkylene and isocyanato;

neutralizing the phenolic OH's of the resulting polymer with an alkali metal alkoxide selected from the group consisting of lithium, sodium and potassium alkoxide; and removing any residual solvent from the resulting neutralized polymer.

19. A process for preparing a solvent-free polymer electrolyte, comprising the steps of:
 (a) heating polymethylhydrosilane and 2,6-di-t-butyl 4-vinylphenol in the presence of a solvent, to a temperature in the range from about 40° to about 70° C.;
 (b) cooling the mixture obtained in step (a), to a temperature in the range of about 0° C. to about room temperature;
 (c) adding ω-allyl methoxy hepta (oxyethylene) to the cooled mixture obtained in step (b);
 (d) heating the mixture obtained in step (c) to a temperature in the range from about 40° to about 70° C. to obtain a polymer product having phenolic OH groups attached thereto;
 (e) neutralizing the phenolic OH groups of the polymer product obtained in step (d) with sodium t-butoxide;
 (f) removing the solvent and t-butyl alcohol formed in the neutralizing step (e); and
 (g) completely drying the resulting polymer.

20. A high energy density battery containing the solvent-free polymer electrolyte as set forth in claim 1.

21. A high energy density battery containing the solvent-free polymer electrolyte as set forth in claim 7.

22. A high energy density battery containing the solvent-free polymer electrolyte as set forth in claim 19.

* * * * *